(No Model.)

C. L. BEERS.
PROTECTIVE BANK CHECK SYSTEM.

No. 604,926. Patented May 31, 1898.

WITNESSES:
H. B. Smith
M. A. Leyden

INVENTOR
Charles L. Beers
By E. Laass
his ATTORNEY

UNITED STATES PATENT OFFICE.

CHARLES L. BEERS, OF SCRANTON, PENNSYLVANIA.

PROTECTIVE BANK-CHECK SYSTEM.

SPECIFICATION forming part of Letters Patent No. 604,926, dated May 31, 1898.

Application filed September 7, 1897. Serial No. 650,729. (No model.)

*To all whom it may concern:*

Be it known that I, CHARLES L. BEERS, of Scranton, in the county of Lackawanna, in the State of Pennsylvania, have invented new and useful Improvements in Protective Bank-Check Systems, of which the following, taken in connection with the accompanying drawings, is a full, clear, and exact description.

The object of this invention is to enable persons to draw on their bank-account when remote from the bank and in localities where said persons require identification in order to have their checks honored or accepted, and for this purpose I have devised the protective bank-check system hereinafter described, and summed up in the claims.

Figure 1:
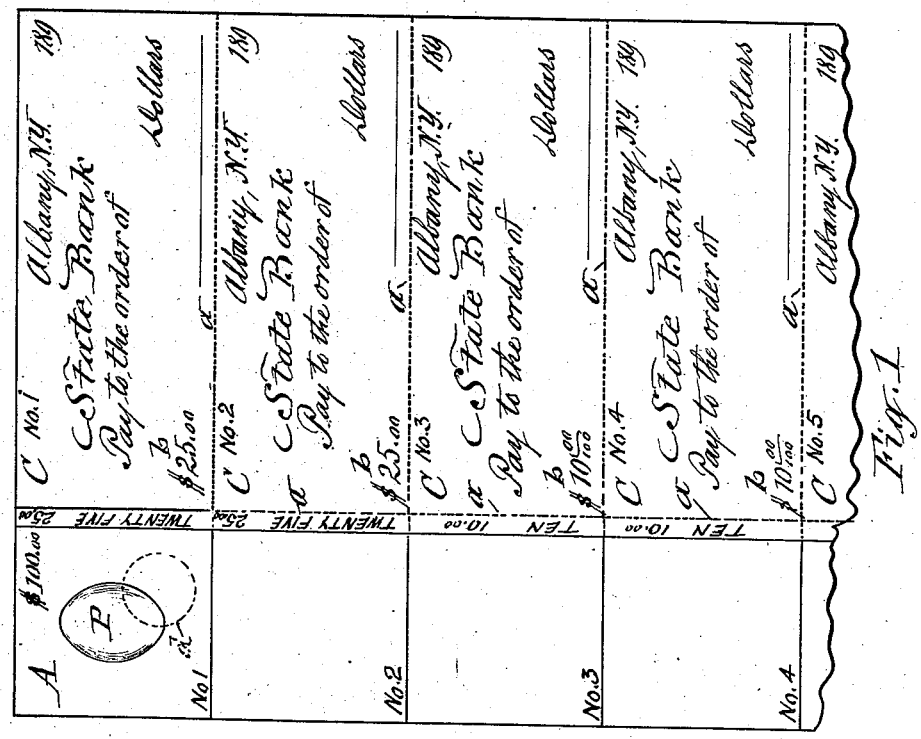
Figure 2:
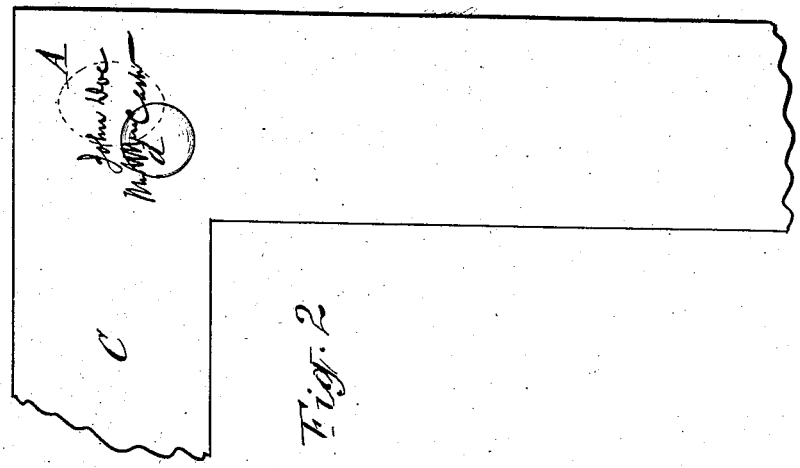

In the annexed drawings, Figure 1 is a face view of a sheet embodying my improved bank-check system; and Fig. 2 is a view of the back of the main portion of said sheet, a number of checks having been torn off.

C C C represent a series of blank checks printed on the same sheet and detachable along the lines $a$ $a$ $a$, which may be slitted or perforated to facilitate the separation of the checks. Upon each of these checks the bank is to definitely mark, preferably by means of a perforating-stamp, the amount for which the check may be drawn. Said amount is indicated at $b$. One of the end checks has permanently attached to it or integral with it a stub A, upon which is marked the sum of the amounts marked on the entire series of checks, which sum represents the amount credited to the user of the sheet by the bank which furnishes said sheet. Said stub has also space for writing upon it the amount of each check drawn and severed from the sheet. By these means the user of the checks is hindered from drawing in excess of the amount credited to him by the bank. To the stub A is also permanently applied a suitable reliable mark by which to identify the drawer of the checks. For this mark of identification I prefer to use either a photograph or other suitable picture or likeness of the drawer, printed or otherwise permanently secured to the stub, as indicated at P in Fig. 1 of the drawings. In addition to this mark of identification the name of the drawer is to be written or a facsimile thereof printed either on the front or back of the stub and preferably across the aforesaid picture. Furthermore, the bank on which the checks are drawn places its stamp or other private mark on the stub in such a position as to extend either partly or wholly across the aforesaid picture and signature, as indicated by the dotted circle $d$.

For a further protection against the misuse of my protective check system the cashier of the bank is to write his name or print a facsimile thereof on the stub A.

In using my described protective check system the drawer of the check fills out the blank marked with the desired amount and marks the same amount on the stub A, thus showing at once the balance of the amount standing to his credit on account of the series of checks C C, furnished to the drawer by the bank.

To draw the money for the aforesaid check, the drawer is required to present the sheet, with the check attached thereto, to the bank or payer, who severs the check from the sheet.

The described marks of identification on the stub A enables the user of my protective check system to obtain acceptance of his checks in places where he is a stranger and unable to find a person to identify him in the customary manner.

An essential requirement in the use of my invention consists in permitting no person to detach a check from the sheet except the payer of the check, and in presenting the last check for payment all the stubs are attached to said check and are surrendered with it.

It is obvious that the bank should keep a record of the sheets issued by said bank.

What I claim as my invention is—

1. The protective bank-check system, consisting of a sheet containing a series of detachably-united bank-checks, a stub permanently attached to one of said checks and having marked on it the limit of the total amount the series of checks may be drawn for, and a mark of identification of the drawer of the checks applied to said stub.

2. The improved bank-check system, consisting of a sheet containing a series of blank checks detachably united and each having permanently marked on it the amount for which said check may be drawn, and a stub permanently attached to one of the checks and having marked on it the sum of the amounts marked on the series of checks, as set forth.

3. The protective bank-check system, consisting of a sheet containing a series of blank checks detachably united and each having marked on it the amount for which said check may be drawn, a stub permanently attached to one of said checks and having marked on it the sum of the amounts marked on the series of checks, and a mark of identification of the drawer applied to said stub.

4. The protective bank-check system, consisting of a sheet containing a series of blank checks detachably united, a stub permanently attached to one of said checks and having marked on it the total amount for which the entire series of checks may be drawn, and a photograph or analogous likeness of the drawer of the checks applied to the stub, as set forth.

5. The protective bank-check system, consisting of a sheet containing a series of blank checks detachably united, a stub permanently attached to one of said checks and having marked on it the total amount for which the series of checks may be drawn, a photograph or analogous likeness of the drawer applied to the stub and the seal or other private mark of the bank applied to said likeness, as set forth.

6. The protective bank-check system, consisting of a sheet containing a series of blank checks detachably united, a stub permanently attached to one of said checks and having marked on it the total amount for which the entire series may be drawn, a photograph or analogous likeness of the drawer applied to said stub, the signature of the drawer across said picture and the seal or private mark of the bank applied to said likeness and signature, as set forth.

7. The protective bank-check system, consisting of a sheet containing a series of blank checks detachably united and each having marked on it the amount for which the check is to be drawn, a stub permanently attached to one of said checks and having marked on it the sum of the amounts marked on the series of checks, a photograph or analogous likeness of the drawer applied to said stub, the signature of the drawer on said likeness, the seal or other private mark of the bank applied to said likeness and signature, and the signature of the cashier of the bank applied to said stub, as set forth.

In testimony whereof I have hereunto signed my name this 31st day of August, 1897.

CHARLES L. BEERS. [L. S.]

Witnesses:
  J. J. LAASS,
  M. A. LEYDEN.